US009227633B2

(12) United States Patent
Svensson et al.

(10) Patent No.: US 9,227,633 B2
(45) Date of Patent: Jan. 5, 2016

(54) METHOD AND A SYSTEM FOR CHANGING A VEHICLE'S TRAJECTORY (71) Applicant: VOLVO LASTVAGNAR AB, Göteborg (SE)

(72) Inventors: Jan-Inge Svensson, Göteborg (SE); Jochen Pohl, Göteborg (SE); Sten Ragnhult, Onsala (SE)

(73) Assignee: Volvo Lastvagnar AB, Göteborg (SE)

( * ) Notice: Subject to any disclaimer, the term of this patent is extended or adjusted under 35 U.S.C. 154(b) by 61 days.

(21) Appl. No.: 14/040,625

(22) Filed: Sep. 28, 2013

(65) Prior Publication Data

US 2014/0032052 A1    Jan. 30, 2014

Related U.S. Application Data (63) Continuation of application No. 13/380,942, filed as application No. PCT/SE2009/000339 on Jun. 29, 2009, now abandoned.

(51) Int. Cl.
| B60W 30/12 | (2006.01) |
| B60W 10/18 | (2012.01) |
| B60W 10/20 | (2006.01) |
| B60T 8/17 | (2006.01) |
| B60T 8/1755 | (2006.01) |
| B62D 5/04 | (2006.01) |
| B62D 6/00 | (2006.01) |
| B62D 15/02 | (2006.01) |

(52) U.S. Cl.
CPC .............. *B60W 30/12* (2013.01); *B60T 8/1708* (2013.01); *B60T 8/17557* (2013.01); *B60W 10/18* (2013.01); *B60W 10/20* (2013.01); *B62D 5/0472* (2013.01); *B62D 6/008* (2013.01); *B62D 15/025* (2013.01); *B60T 2201/083* (2013.01)

(58) Field of Classification Search
CPC .............. B60T 8/1708; B60T 8/17557; B60T 2201/083; B62D 5/0472; B62D 15/025; B62D 6/008; B60W 30/12; B60W 10/18; B60W 10/20
USPC ........................................ 701/42, 41; 180/446
See application file for complete search history.

(56) References Cited

U.S. PATENT DOCUMENTS

| 6,349,789 B1 * | 2/2002 | Nakano et al. ................. 180/446 |
| 7,725,227 B2 * | 5/2010 | Pattok et al. ...................... 701/41 |
| 7,970,513 B2 * | 6/2011 | Yasui et al. ....................... 701/41 |
| 2001/0054519 A1 * | 12/2001 | Nishiwaki et al. ............. 180/167 |
| 2005/0240328 A1 * | 10/2005 | Shirato et al. .................... 701/41 |
| 2007/0294009 A1 * | 12/2007 | Yasui et al. ....................... 701/41 |
| 2009/0024279 A1 * | 1/2009 | Takeda et al. .................... 701/41 |

* cited by examiner

*Primary Examiner* — Marthe Marc-Coleman
(74) *Attorney, Agent, or Firm* — WRB-IP LLP (57) ABSTRACT

A method for changing a vehicle's trajectory, wherein the vehicle includes a steering arrangement including a manual steering device, at least one pair of ground engaging members and a mechanical interconnection therebetween, includes the steps of applying a braking force to at least one of the ground engaging members so that the vehicle's trajectory is changed, and simultaneously suppressing steering device disturbances resulting from the mechanical interconnection.

25 Claims, 4 Drawing Sheets

METHOD AND A SYSTEM FOR CHANGING A VEHICLE'S TRAJECTORY

The present application is a continuation of application Ser. No. 13/380,942, filed Dec. 27, 2011, which is the U.S. national stage of International Application PCT/SE2009/000339, filed Jun. 29, 2009, both of which are incorporated by reference.

BACKGROUND AND SUMMARY

The present invention relates to method and a system for changing a vehicle's trajectory, wherein the vehicle comprises a steering arrangement comprising a manual steering device, at least one pair of ground engaging members and a mechanical interconnection between the manual steering device and said ground engaging members.

A number of active safety functions aim at changing the vehicles future trajectory, for reasons such as avoiding a collision, a roadway departure or obtaining a proper lane position. A change in trajectory can be done through a change in steering wheel angle, which is exactly what the driver does while driving the vehicle.

Thus, the vehicle's trajectory may be changed due to an undesired situation such as a departure from a desired future trajectory of the vehicle. In other words, the invention is applicable for so-called lane keeping of a vehicle during operation. A current driving scenario that represents an unintentional lane departure may be determined based on the vehicle's position, direction and/or orientation with respect to a traffic lane (r road edge). Further, there are systems known, which are configured for monitoring the course of the traffic lane ahead of the vehicle, such as by monitoring lane markings using a vision system. The lane keeping support system is preferably configured to provide such guiding force only in situations in which the supply of such guiding force to the steering device is deemed to be appropriate after analysis of all input data, such as the course of the traffic lane ahead of the vehicle, further vehicles on the road and a predicted driving behaviour of the vehicle.

The guiding force exerted onto the steering device is resistive if counteracting the force applied by the driver onto the steering device, or supportive if acting in the same direction as the force applied by the driver onto the steering device, thus for instance reducing the effect of e.g. frictional forces acting on the wheels and the like which are experienced by the driver as resistance when operating the steering, device. The steering device is normally formed by a conventional steering wheel in the case of a vehicle. However, the invention is applicable to other steering devices, such as a joystick, a sliding nipple or any other suitable steering device for steering the vehicle. For instance, in the case that the steering device is a steering wheel, the guiding force will appear as a guiding torque exerted onto the steering wheel.

In many countries/regions there are legal requirements limiting the allowable guiding force to be applied to the steering device. According to a known method, the guiding torque applied to the steering wheel is automatically limited to the allowed limit during an intervention. However, such automatic limitation may lead to that the intervention is unsuccessful since the intervention could not be carried out to the desired extent.

It is desirable to achieve a method for changing a vehicle's trajectory which creates conditions for a further improved safety during operation, especially in case there is a predefined limit for the amount of a steering device guiding force.

A method according to an aspect of the invention includes applying a braking force to at least one of said ground engaging members so that the vehicle's trajectory is changed, and simultaneously suppressing steering device disturbances resulting from the mechanical interconnection.

The term "ground engaging members" comprises wheels fitted with tyres, but may also cover other types of ground engaging members, such as caterpillar tracks.

The braking force is preferably applied by means of a differential braking force to said pair of ground engaging members.

Thus, the vehicles trajectory can be changed by differential braking,—where a longitudinal force is generated by applying a brake pressure to a single wheel or a wheel pair (such as front and rear at the same side). The resulting longitudinal force generates a torque around the vehicles centre of gravity, thereby changing the vehicle trajectory.

A problem with prior art solutions for differential braking on the front axle is that a disturbing torque is introduced into the steering system which results in a steering wheel angle. As a consequence, a front axle sideslip angle is introduced, which results in a lateral force. This force can act so that the resulting torques of lateral and longitudinal force around the vehicle's centre of gravity counteract or act in the same direction. Which of these two alternatives that is the case depend on the actual design of the front suspension. In any case, the exact amount of the achieved steering wheel angle is dependent whether the driver has the hands on the wheel or not, and which steering wheel angle that is allowed by the driver. In other words, the loop gain of the transfer function between lateral acceleration (or yaw rate) and brake pressure for wheel brake torque) is dependent on both the actual vehicle front suspension and the driver.

By the inventive step of simultaneously suppressing steering device disturbances resulting from the mechanical interconnection, the problem of the disturbing torque introduced into the steering system is relieved.

According to an example embodiment, the method comprises the step of receiving a signal indicative of a current driving scenario, determining if it is desired to change the vehicle's trajectory by braking said at least one ground engaging member based on the driving scenario signal in order to avoid an undesired situation and if so automatically applying, the braking force to said at least one ground engaging member. Thus, changing the vehicle's trajectory can be performed also in additional ways to braking said at least one ground engaging member. One such additional way is to charge the vehicle's trajectory by steering via the steering arrangement. For example a guiding force is applied to the steering device for changing the vehicle's trajectory. Preferably, the guiding force is applied during a driver steering operation. Preferably, the guiding force applied is only supportive, i.e. it is limited to such an extent that the driver still has full authority to steer the vehicle. However, the system may be configured to take control of the vehicle and in the case of lane keeping, return it to a safe position in the original lane.

Preferably, the undesired situation represents a predicted departure from a predicted desired future trajectory of the vehicle.

According to a further example embodiment, the method comprises the step of suppressing said steering device disturbances resulting from the mechanical interconnection by decoupling a driver steering feel from the influence of the mechanical connection. Thus, this embodiment creates conditions for decoupling the hardware (mechanical connection)

from the steering feel. In other words, the embodiment creates conditions for an application-independent (hardware-independent) steering feel.

According to a further example embodiment, the method comprises the step of suppressing said steering device disturbances resulting from the mechanical interconnection by receiving a signal indicative of a steering angle and/or steering, torque in the steering arrangement, determining if the steering angle will result in steering device disturbances, determining if it is desired to apply a force counteracting the steering device disturbances resulting from the steering angle and/or steering torque and if so generating a corresponding signal to an actuator arranged to apply such a counteracting force to the steering arrangement.

Preferably, a steering torque is determined by measuring the twist of a torsion bar in the steering arrangement. More precisely, a first angular sensor is arranged at a first end of the torsion bar and a second angular sensor is arranged at a second end of the torsion bar (opposite the first end). The steering torque can be determined based on the relative angular movement (twist) of the torsion bar and the stiffness of the torsion bar. According to an alternative, one or several strain gauges may be used.

Such a method may be performed via an Electronic Power Assisted System (EPAS) comprising a controlling function, below referred to as a reference generator, which is configured to determine a desired torque to be applied, to the steering wheel in order to provide the driver with a desired steering feel. In other words, the reference generator describes a nominal vehicle.

Thus, there is a mechanical connection between the steering device and the ground but the inherent steering feel resulting from the mechanical connection during, operation is eliminated or at least suppressed. In other words, the t guiding force is continuously determined during operation so that the driver experiences a desired feel in the steering device instead of the inherent steering feel resulting from the mechanical connection.

When a reference generator is used for steering system control, then the disturbance torque is automatically compensated for, and thus no front axle slip angle is produced, and thus no lateral force. The influence of both suspension geometry and driver is thus effectively removed from the loop. The braking function therefore becomes a much more predictable process.

Therefore, according to a further example embodiment, the method comprises the step of providing the driver of the vehicle with a desired steering feel based on a determined desired guiding force, which is applied to the steering device. Preferably, the method comprises the step of applying the determined guiding force to the steering device via said actuator. From an implementation point-of-view it is wise to add guiding torque via the actuator if the actual torque is lower than the desired torque for a determined steering feel and to cancel guiding torque via the actuator if the actual torque is higher than the desired torque for the determined steering feel.

According to a further example embodiment, the method comprises the step of receiving at least one signal indicative of a vehicle state and determining the guiding force based on said at least one vehicle state signal. Preferably, the method comprises the step of determining a value and direction of the guiding force for changing the vehicle's future trajectory. The value of the guiding force may be determined for assisting the driver in changing the vehicle's future trajectory.

According to a further example embodiment, the method comprises the step of comparing the determined guiding force with a limit value, and if the determined guiding force exceeds the limit value applying, the braking force to said at least one ground engaging members so that the vehicle's trajectory is changed.

The limit value can represent a maximum allowable torque, which the EPAS can add due to legal requirements or internal safety requirements. Preferably, the changing of the vehicle's trajectory is performed via the steering arrangement and only if such a limit is reached the brakes are used to increase the torque around the vehicles centre of gravity, thereby contributing to the change the vehicle trajectory or alternatively completely taking over the steering.

Let's say we would like to steer the vehicle to the right and the suspension geometry is as in one type of truck. We would then brake the wheels on the right hand side of the vehicle. We would get a torque around the centre of gravity turning the vehicle in the clockwise direction. Without the reference generator function the front right wheel would get a disturbance angle to the right. With the reference generator function this disturbance angle would be removed leading to a much more predictable steering by braking.

According, to a further example embodiment, the method comprises the step of limiting the guiding force applied to the steering device to the limit value or below. Thus, in addition to the steering by braking, a steering effect is achieved by means of the steering arrangement.

According to a further example embodiment, the method comprises the step of determining the guiding force based on at least one steering device guiding force operation model. Preferably, the method comprises the steps of continuously during operation determining the guiding force, continuously applying the determined guiding, force to the steering device, and modifying/interrupting the determined guiding force if the limit value on steering device torque is reached.

Preferably, said at least one guiding force operation model comprises at least one desired steering characteristic parameter. Preferably, said at least one desired steering characteristic parameter comprises at least one of damping, of steering device movements, tire friction, self alignment of the steering device to a neutral position and friction in a mechanical connection between the steering device and the wheels. Especially, said at least one desired steering characteristic parameter comprises at least lateral acceleration and/or yaw, rate and the method comprises the step of modifying and/or canceling the effect of the lateral acceleration and/or yaw rate.

A steering by braking will give a lateral acceleration (or yaw rate) on the vehicle which will give a deviation between the real vehicle behaviour and the behaviour estimated by the vehicle model in the reference generator function. >>This deviation will give a torque in>the steering wheel that will work against the steering by braking. To avoid this the measured lateral acceleration (or yaw rate) needs to be decoupled during a steering, by braking. Alternatively this torque in the steering wheel can be compensated for since we know how much torque around the centre of gravity the steering by braking will give.

The desired lateral acceleration (yaw rate) from steering by braking will give a desired torque around the vehicles centre of gravity by using the estimated Inertia of the vehicle. From the desired torque around the vehicles centre of gravity brake forces can be calculated if the track width is known.

Further, to be able to know how much torque around, the vehicles centre of gravity the brakes will contribute with ifs advantageous to have a good estimate of the brake factors of the brakes. The brake factor relates the brake pressure to the brake torque and can vary due to e.g. speed, brake pressure, temperature and contamination.

It is also desirable to achieve a system for changing a vehicle's trajectory which creates conditions for a further improved safety during operation, especially in case there is a predefined limit for the amount of the guiding force.

A system for changing a vehicle's trajectory according, to an aspect of the invention is provided, wherein the vehicle comprises a steering arrangement comprising a manual steering device, at least one pair of ground engaging members and a mechanical interconnection therebetween characterized in that the system comprises an arrangement for applying a braking force to at least one of said ground engaging members so that the vehicle's trajectory is changed, and an arrangement for suppressing steering device disturbances resulting from the mechanical interconnection.

According to an example embodiment, said arrangement for suppressing steering device disturbances comprises means for detecting a steering angle and/or steering torque in the steering arrangement, means for determining if the steering angle and/or steering torque will result in steering device disturbances and generating a corresponding signal and an actuator arranged to receive the signal and responsively apply a force counteracting the disturbances to the steering arrangement. Preferably, a delivered steering device guiding force is measured and compared with an estimated desired steering device guiding force, wherein the delivered steering device guiding, force is adapted by use of a feedback controller to be substantially the same as the desired steering device guiding force through adapting the amount of said guiding force.

According to a further example embodiment, said system comprises means for receiving a signal indicative of a current driving scenario, determining if it is desired to change the vehicle's trajectory by braking based on the driving scenario signal and generating a corresponding braking force signal to said means for applying a braking force.

According to a further example embodiment, said means for determining if it is desired to change the vehicle's trajectory is configured to generate a signal to a means for controlling the steering arrangement.

According to a further example embodiment, said system comprises means for providing the driver of the vehicle with a desired steering feel based on a determined desired guiding force.

Further preferred embodiment and advantages thereof emerge from the description below, the figures and the claims.

BRIEF DESCRIPTION OF FIGURES

The invention will be described in greater detail below with reference to the embodiment shown in the accompanying drawings, in which FIG. 1 schematically shows a system for performing, the inventive method according to one embodiment.

DETAILED DESCRIPTION

Figure 1:
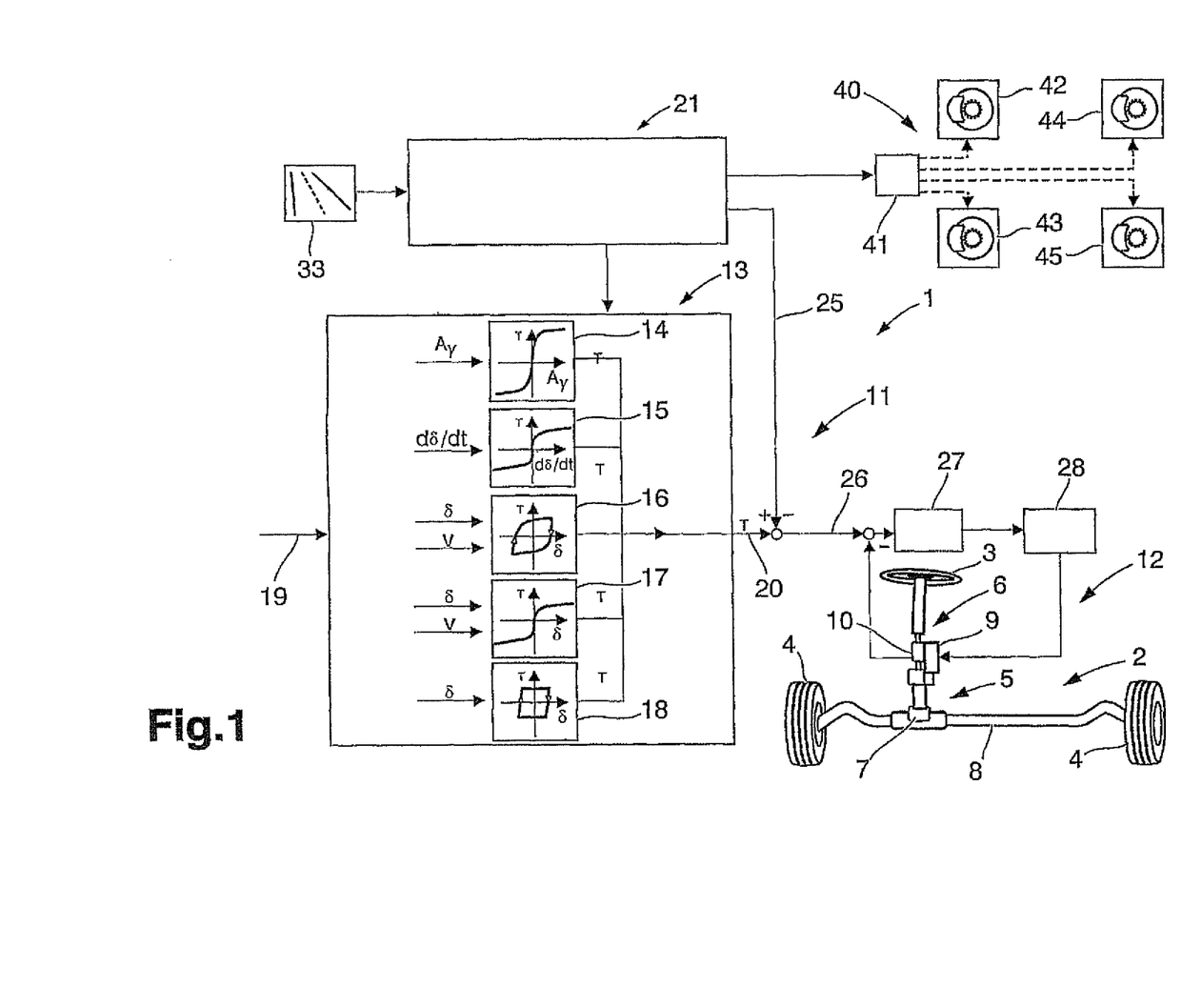

The invention is below described for application in a truck. However, the invention should not be regarded as limited to trucks, but it may be applied also in other vehicles, such as cars. FIG. 1 schematically shows a system 1 for performing a control method—according to one embodiment. The system 1 comprises a mechanical steering arrangement 2, which may be of a conventional type. The mechanical steaming arrangement 2 comprises a steering device 3 in the form of a steering wheel, at least one ground engagement member 4 in the form of a wheel and a mechanical connection 5 between the steering wheel 3 and the wheels 4 for transmission of steering signals from the steering wheel 3 to the wheels 4.

The steering wheel 3 is arranged in a vehicle passenger compartment and manually operated by the driver of the vehicle to steer the wheels 4. The steering arrangement 2 comprises a steering linkage means 6 extending from the steering wheel 3 down to a Hydraulic Power Assisted System (HPAS) 7 for converting angular rotation in the steering linkage 6 to a linear movement via a steering member 8. The steering linkage means 6 comprises an electric steering gear. The HPAS may be of conventional type comprising a hydraulic cylinder (not shown) and a torsion bar (not shown). The steering member 8 is coupled on opposite ends to a left and right wheel 4 and configured to turn the wheels 4 in response to steering signals from the steering wheel 3.

The system 1 further comprises an actuator 9 to provide supported adjustment of the steering angle. The actuator 9 is preferably formed by an electric motor. The actuator 9 provides a guiding force, and more specifically a guiding torque, or assist torque, to the steering assembly for assisting the driver in steering the steering wheel. The electric motor may be arranged around a steering column in the steering arrangement 2, wherein the magnetic field acts directly on the steering column. Alternatively, the electric motor may be arranged beside the steering column and act on the steering column via a mechanical linkage/, preferably via pinion gears.

The system 1 further comprises a torque-measuring, device 10 for measuring a manual torque applied by the driver to the steering wheel. The torque-measuring device 10 is of elastic constitution and preferably comprises a torsion bar. In other words, a steering wheel angle is measured via the torsion bar. More specifically, the electric steering gear comprises said torsion bar.

The system 1 further comprises an Electrical Power Assisted Steering (EPAS) system 11. The EPAS 11 comprises a regulating loop 12, which is configured to achieve a torque-free steering. The regulating loop 12 is configured to receive an input signal indicative of a current steering torque in the steering wheel 3. The input signal is received from the torque-measuring, device 10. Basically, the regulating loop 12 is configured to output a signal to the actuator 9 so that said torque free steering is achieved.

The regulating loop 12 comprises a controller, or regulator, 27 which comprises a filter function. The filter function may be based on an inverse model of the steering dynamics of the present vehicle. Further, the regulator 27 may be configured to reduce errors in the model and to reduce disturbances and measurement noise in order to reduce the risk of instability in the system.

The regulator 27 is configured to receive a signal indicative of a torque to be applied to the steering arrangement via the electric motor and, in response thereto produce an output signal. The regulating loop 12 further comprises an electric motor control means 28, which is configured to receive the output signal indicative of a torque from the regulator 27 and produce a signal with a corresponding current value to the electric motor. According to an alternative, the regulator 27 and the electric motor control means 28 are combined in a single controller.

The EPAS further comprises a controlling function 13, below referred to as a reference generator, which is configured to determine a desired torque to be applied to the steering wheel in order to provide the driver with a desired steering feel. In other words, the reference generator describes a nominal vehicle."

Further, the reference generator 13 is operatively connected to the regulating loop 12 and outputs a signal indicative of a desired steering torque. The regulating loop is configured to compare the desired steering torque to the actual, current steering torque and continuously adapt the output signal to the actuator so that the desired steering torque is transmitted to the driver. In other words, the actuator is controlled so that it applies the difference in torque between the desired torque value from the reference generator and the current actual torque in the steering assembly so that the actual torque is controlled to substantially equal the desired torque.

The reference generator 13 comprises at least one steering device guiding force operation model and in the example in FIG. 1 a plurality of guiding force operation models 14,15, 16,17,18. The guiding force operation model preferably comprises a mathematical model. The model (s) is designed in a way to achieve a desired steering feel in the steering, device. Thus, the model (s) can be designed in different ways for different vehicle types and/or for different desired steering feels.

Further, the model (s) comprises at least one desired steering characteristic parameter. More specifically, each model is configured to produce a guiding torque value T for one desired and predetermined steering characteristic parameter based on at least one input 19. In other words, the steering characteristic parameter is a guiding force influencing operational parameter. Each model comprises a mathematical function, wherein the torque value is determined as a function of a value of the input, see illustrated examples of the functions in FIG. 1.

The individual torque values resulting from the models are summed up to a torque sum, which forms an output 20 from the reference generator. According to the shown embodiment, the reference generator comprises models for the following steering characteristic parameters, vehicle lateral acceleration, damping of steering device movements, tire friction, self alignment of the steeling device to a neutral position and friction in the mechanical connection between the steering device and the wheels.

The signals input to the reference generator comprises a at least one signal indicative of a steering intent of the driver, such as a steering wheel angle ($\delta$) and a rate of change of >>the steering wheel angle ($d\delta/dt$). According to an alternative to the steering wheel angle, the signal indicative of a steering intent may be an electric motor angle or a wheel angle. According to an alternative to the rate of change of the steering wheel angle, the signal indicative of a steering intent may be a rate of change of the electric motor angle or a rate of change of the wheel angle.

The signals input to the reference generator comprises at least one signal indicative of a vehicle body motion, such as lateral acceleration (Ay) and/or yaw rate. Such a vehicle body motion may be sensed by a sensor arranged in the vehicle.

The vehicle lateral acceleration model 14 preferably receives a signal indicative of a current lateral acceleration as an input signal. According to a preferred example, the vehicle lateral acceleration is the most important steering characteristic parameter.

The damping model 15 represents a predetermined relationship between a guiding torque value and the current steering wheel speed for achieving a desired steering feel. Thus, the damping model 15 preferably receives a signal indicative of a steering wheel speed (rate of change of the steering wheel position).

According, to the example function shown in FIG. 1, the torque value increases dramatically for small input values of the steering wheel speed. Further, the torque value increases substantially less for larger input values of the steering wheel speed. In other words, the curve flattens out. The damping model 15 is preferably a pure statical mapping. The torque value output from the damping model is configured to act i in an opposite direction with regard to the current steering wheel speed. The damping model is preferably designed so that the resulting torque is smaller for higher steering wheel speeds and higher for smaller steering wheel speeds. In this way, the damping torque is proportional to the steering wheel angle speed during normal driving and limited to a maximum value during parking or evasive manouevres.

Thus, the vehicle lateral acceleration model 14 and the damping model 15 are linked to each other.

The self alignment model 17 represents a predetermined relationship between a guiding torque value and the current steering wheel angle for achieving a desired steering feel. By self alignment of the steering device to a neutral position is meant an active return, i.e. the return of the released steering wheel to a central setting. The self alignment model 17 preferably receives a signal indicative of the steering wheel angle and a signal indicative of vehicle speed as input signals. The purpose of the vehicle speed input signal is to be able to modulate the desired aligning torque with the current vehicle speed in a way that the self alignment torque can be reduced during high speed driving.

Regarding the friction models 16,18; a certain amount of friction feel in the steering wheel is desired. For example, Coulomb friction is desired during on-centre handling in order to achieve a desired torque build-up for small steering wheel angle deviations. Further, Coulomb friction is as well desired while driving long curves, so that the steering forces are reduced,—wherein the driver can "rest" the steering wheel on the friction.

The tire model 14 comprises a hysteresis curve, which represents a tire model. Preferably, the model 16 is a dynamic model of an unrolling tire with regard to steering torque. The relation between the steering wheel angle and the torque is given by a physical relationship, where the deflection of individual rubber elements is modeled dependent on the differential angle of the steering wheel and the torsion and relaxation of the rubber elements due to the rolling tire. The resulting model yields thus a smaller hysteresis effect with increasing vehicle speed and constant steering wheel angle frequency.

The inventive method, creates conditions for canceling the actual friction effect in the steering wheel resulting from the actual steering arrangement and instead applying a desired resistance torque to the steering wheel, which represents a nominal friction feel for the driver. Thus, the hardware (mechanical steering, arrangement) is decoupled from the friction steering feel. In other words, the invention creates conditions an application-independent (hardware-independent) friction steering feel.

The tire friction model 16 and the mechanical connection friction model 18 are in principle similar to each other. The tire friction model 16 represents the friction between the tire and the ground while the mechanical connection friction model 18 represents the friction in the upper steering wheel steering column assembly. Thus, the friction coefficient in the mechanical connection friction model 18 is higher than in the tire friction model 16. The tire friction model 16 preferably receives a signal indicative of a steering wheel angle and a signal indicative of vehicle speed.

The mechanical connection friction model 18 preferably receives a signal indicative of a steering wheel angle.

According to an example of the friction model 18, the value of the steering wheel angle δ is multiplied by a stiffness K, which corresponds to a lumped spring stiffness in Nm/Rad. The resulting value is input to a Laplace operator s. The derived steering wheel angle signal, i.e. the steering wheel angle speed multiplied with the stiffness K is used in an integrating function with anti windup functionality, indicated through the integrational limits and the inverse of the laplace transformator. The limit values are chosen in order to limit the frictional torque to the desired maximum and minimum values. The mentioned anti-windup functionality is intended to cease integration once the integrational limits are reached. The relationship between the steering wheel angle δ and the output torque value is schematically shown in box 18 in FIG. 1.

The steering characteristic model (s) 14,15,16,17,18 is preferably designed so that a different steering characteristic parameter takes precedence over the others in different driving scenarios. According to one example, the lateral acceleration is configured to take precedence over the other steering characteristic parameters during driving in high speed. According to a further example, steering system friction and tire friction are configured to take precedence over the other steering characteristic parameters during driving in low speed. The damping torque is equally active regardless of vehicle speed. According to a further example, the self alignment is configured to take precedence over the other steering characteristic—parameters during driving in an intermediate speed interval between the high speed and the low speed.

The present invention concerns a method for assisting the driver of the vehicle during operation. According to a preferred embodiment, the control method is configured to allow a control of the steering characteristics experienced by a driver of the vehicle during traveling. In other words, the control method is configured to provide the operator with a steering feel (or steering sensitivity or tactile feedback) through the steering wheel.

With regard to friction feel, according to an example embodiment, the method comprises the step of determining the desired resistance torque based on an input representing a steering angle. By determining a direction of the actual steering angle (clockwise or counterclockwise) and instantly applying a torque in the same direction, the effect of the friction in the steering arrangement can be effectively cancelled.

The system 1 further comprises a safety function 21 in the form of a lane keeping control function. The lane keeping control function 21 is configured to avoid a departure from an intended desired future trajectory of the vehicle. Lane keeping functions are known and will not be described in detail here. The lane keeping function 21 is configured to predict if a guiding force to—a vehicle steering, device is desired in order to avoid an unintentional lane departure based on a current driving—scenario. More specifically, the lane keeping control function 21 receives at least one input 33 indicative of the current driving scenario and responsively determines an output torque value 25.

The lane keeping control function 21 comprises a lane monitoring system 33, preferably comprising a camera.

The lane monitoring system 33 produces a signal indicative of a current lane position. The lane keeping control function 21 further receives a signal (not shown) indicative of a required lane position and possibly a signal (not shown) indicative of a vehicle speed.

The lane keeping control function 21 is configured to determine (calculate) a lateral acceleration value based on the required lane position and the vehicle speed. In other words, when the vehicle approaches a curve a value of the lateral acceleration is calculated for maintaining the vehicle in the desired lane during the curve. The lane keeping control function 21 produces an output signal 25 indicative of a corresponding torque value to the steering arrangement 2.

According to one example, the steering arrangement 2 is controlled in accordance with the output signal 25 from the safety function 25 so that the vehicle's trajectory is changed accordingly when the lane keeping function 21 decides that it is necessary.

According to the example shown in figure the output torque value 25 from the lane keeping control function 21 and the output torque value 20 from the reference generator 13 are summed up to a total torque value 26, which is indicative of a desired steering torque to be applied to the steering wheel 3. The regulating loop 12 receives the total desired torque value 26.

Thus, the system is configured to decide whether to cancel a guiding force contribution of at least one of said plurality of desired steering characteristic parameters so that the predicted total guiding force is sufficient for avoiding the undesired situation during said intervention. The frictional effects 16,18 are preferably always cancelled during a lane keeping manouevre. The effect of the lateral acceleration (in the model 14) and/or yaw rate is modified and/or canceled during said application of the braking force to said at least one ground engaging member.

The invention may be applied in a truck comprising a tractor and a trailer having a plurality of wheel axles. Heavy motor vehicles, such as load-carrying commercial vehicles, are normally designed with different brake arrangements 40, for example wheel brakes (i.e. disc brakes) 42,43,44,45, a hydraulic retarder and an engine brake.

The safety function 21 is further configured for comparing the determined guiding force with a limit value. If the determined guiding force exceeds the limit value, a signal is sent to the brake arrangement 40, which is configured to apply a braking force to said at least one ground engaging member so that the vehicle's trajectory is changed. The limit value can represent a maximum allowable torque, which the EPAS can add due to legal requirements or internal safety requirements. Thus, if such a limit is reached the brakes 42,43,44,45 are used to increase the torque around the vehicles centre of gravity, thereby contributing, to the change the vehicle trajectory or alternatively completely taking over the steering.

The braking system 40 comprises a brake controller 41 configured to receive said brake signal and said plurality of brake devices 42,43,44,45. Each brake device 42,43,44,45 is configured to brake one of said wheels individually. The brake controller 41 is configured to generate a brake signal to at least one of said plurality of brake devices 42,43,44,45 in order to change the vehicle's trajectory.

The brake arrangement 40 is preferably an electronically controlled pneumatic brake arrangement. The brake controller 40 forms a computerized control unit which is arranged so as to distribute the available brake pressure in a suitable manner between the brakes of the tractor and the trailer (the brakes of the trailer are not shown). This distribution function is sometimes referred—to as a "brake adaption function" or between the tractor and trailer as a "coupling force control". By means of such a function, a high degree of brake compability, or brake balance, within the tractor and between the tractor and the trailer can be obtained. In other words, the aim with a brake adaptation function is to distribute the brake pressure in an optimum manner within the tractor and between the tractor and the trailer.

In order to control the brake balance of the tractor and the trailer, the so-called "brake factor", or "brake gain", is used as an input parameter to the brake control unit. The brake factor, normally designated Bf, can be defined as a relation between the received, brake torque and the applied brake cylinder pressure for a given wheel axle, i.e. Bf=Tbrake/Pcyi[Nm/bar/axle]

wherein Tbrake indicates the received brake torque for the axle in question, and wherein Poyi indicates the applied brake cylinder pressure for said axle. By determining a value which represents the brake factor Bf for each axle of a vehicle, the control unit may be operated so as to achieve the above-brake adaption function. More precisely, tests can be carried out for a certain wheel axle wherein the applied brake pressure Poyi (i.e. the pressure acting on a wheel brake disc by means of a corresponding brake pad) is measured while the retardation of the free rolling axle is also measured during braking. A value representing the retardation can also be obtained by means of an accelerometer. By measuring the retardation, a value representing the brake torque Tbrake can be calculated. When calculating the brake torque Tbraker certain factors such as the air resistance and the rolling resistance must be compensated for. By using the values of the brake torque Tbrake and the brake pressure Poyi, the brake factor Bf can be calculated using the above-mentioned relationship.

The braking of an axle can further be done when the driver has requested auxilliary braking i.e. braking with an engine brake or retarder. If each axle is braked in order from front to rear with the same amount of brake force as the driver has requested from the auxilliary brakes the brake factor for each axle can be obtained without the driver feeling a disturbance, dividing the brake factor for the axle with two an estimate of the brake factor for each wheel can be obtained.

Consequently, the brake factor Bf can be regarded as a value which represents the efficiency of the brakes. Also, a low brake factor may for example indicate possible malfunctions in the brakes. For example, the contact area of the brakes might be contaminated with dirt or rust, which means that it will need conditioning.

Figure 2:
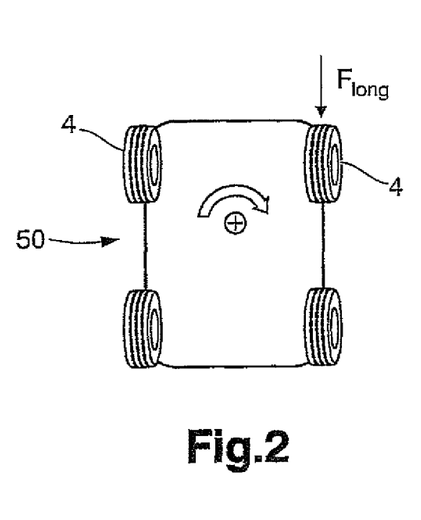
FIG. 2-3 shows two different examples of steering a vehicle by braking
Figure 3:
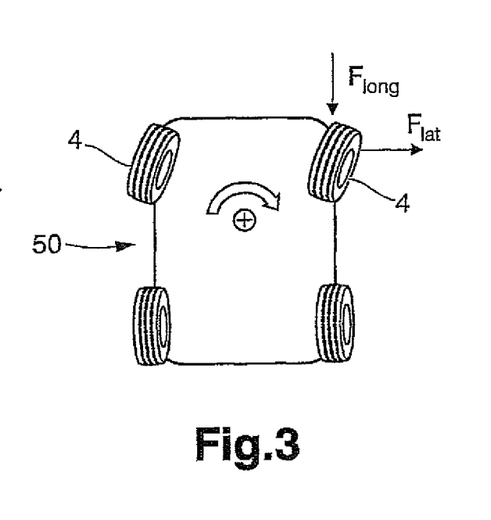

FIGS. 2 and 3 shows two different examples of steering a vehicle by braking. A longitudinal force is generated by applying a brake pressure to a single wheel or a wheel pair (such as front and rear at the same side). The resulting longitudinal force generates a torque around the vehicles centre of gravity, thereby changing the vehicle trajectory. FIGS. 2 and 3 indicates two situations, in which we would like to steer the vehicle to the right. We would then brake the wheels on the right hand side of the vehicle. We would get a torque around the centre of gravity turning the vehicle in the clockwise direction. FIG. 2 discloses a situation where the brake is applied for steering the vehicle, but there is no steering via the steering, arrangement, i.e. the wheels are not angled in relation to a longitudinal direction of the vehicle. FIG. 2 discloses a situation where the brake is applied for steering the vehicle, and in addition the steering arrangement is steered, i.e the wheels are angled in relation to a longitudinal direction of the vehicle.

Figure 4:
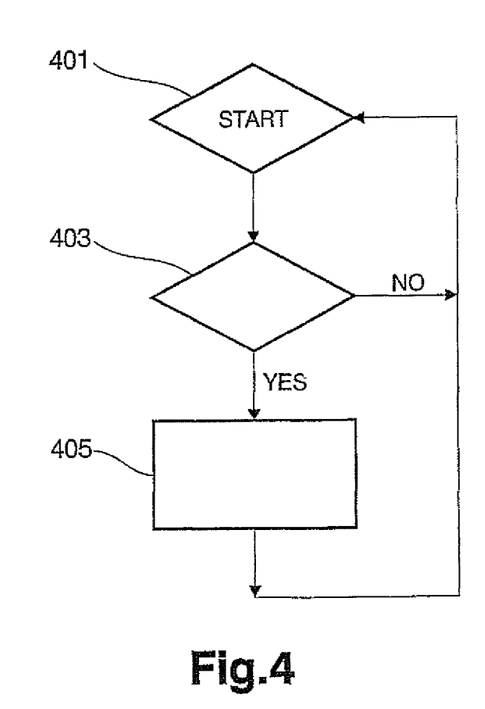
FIG. 4 schematically shows a work flow for the inventive method according to one embodiment, and FIG. 5 schematically shows a flow chart for the inventive method according to one embodiment.

FIG. 4 discloses a flow chart for an embodiment of the control method. The method starts in box 401. The method comprises the step of receiving 403 a signal indicative of a current driving scenario and determining if it is desired to change the vehicle's trajectory by braking said at least one ground engaging member based on the driving scenario signal in order to avoid an undesired situation. If it is determined that the vehicle's trajectory should be changed by braking said at least one ground engaging member a braking force is applied in the next step 405 to said at least one ground engaging member. Simultaneously, steering device disturbances resulting from the mechanical interconnection are suppressed.

Figure 5:
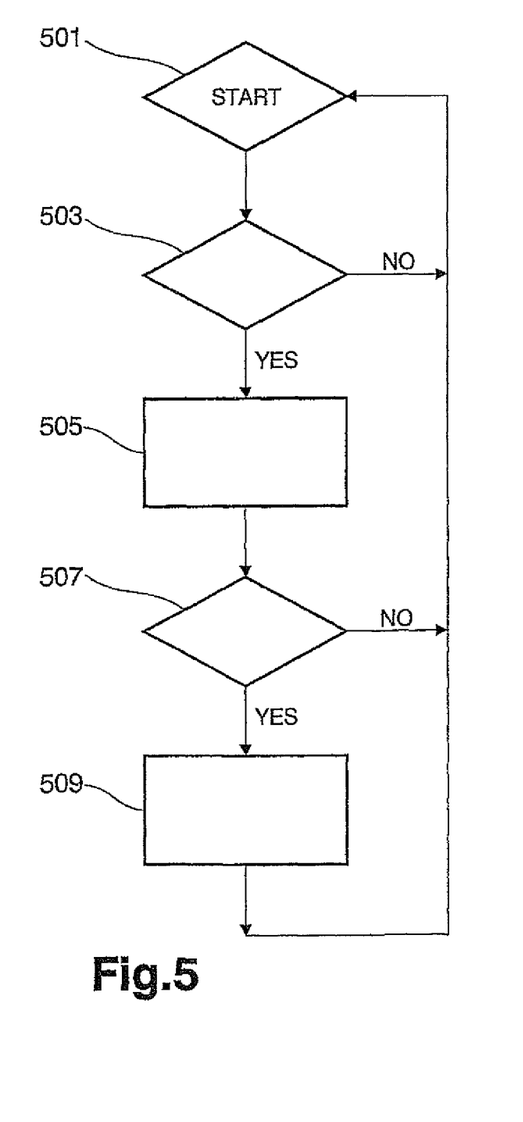

FIG. 5 discloses a flow chart for an embodiment of the control method. The method starts in box 501. The method comprises the step of receiving 503 a signal indicative of a current driving scenario and determining if it is desired to change the vehicle's trajectory by effecting the steering arrangement based on the driving scenario signal in order to avoid an undesired situation. If it is determined that the vehicles trajectory should be changed by steering a steering force is applied in the next step 505 to the steering device. Simultaneously, steering device disturbances resulting from the mechanical interconnection are suppressed. The method then moves on to comparing 507 a steering device guiding force with a limit value, and if the guiding force exceeds the limit value, a braking, force is applied to said at least one around engaging member for changing the vehicle's trajectory. Simultaneously, steering, device disturbances resulting from the mechanical interconnection are suppressed. Especially, the effect of a lateral acceleration in a model for determining steering feel (which has been described above) is suppressed and preferably canceled during said steering by braking.

If the braking force is predicted not to be desired in step 403 (or 503), the method goes back to start 401 (or 501) directly. Likewise, if the predicted guiding force in step 507 does not exceed the limit value, the method goes back to start 501 directly. Further, the method is continuously repeated.

The steering angle is preferably determined by measuring a steering wheel deflection. Alternatively, the steering angle may be determined by measuring, a wheel angle or anywhere in between the steering wheel and the ground engaging wheel in the mechanical steering arrangement.

Although the invention has above been described for lane keeping, the invention is applicable for other active safety functions, such as other path correction functions, such as side wind compensation or collision avoidance (such as Emergency Lane Assist, ELA). In other words, a lane guidance regulation system is integrated into the EPAS. In the same way, further functions may be integrated into an exemplary method according to the present invention.

In order to further increase the driving stability of vehicles, steering, systems may include a driving dynamics regulator that adjusts the setting of the steered wheels independently from the steering, wish of the driver.

The reference generator 13 and the regulating loop 12 (comprising the controllers 27,28) are preferably implemented in software.

A value of the vehicle lateral acceleration may be estimated from a measured vehicle yaw rate.

The invention claimed is:

1. A method for changing a vehicle's trajectory, wherein the vehicle comprises a steering arrangement comprising a manual steering device, an actuator adapted to provide a guiding torque to the steering arrangement, at least one pair of ground engaging, members and a mechanical interconnection between the manual steering device and the ground engaging members, wherein the method includes the step of applying a braking force to at least one of the ground engaging members so that the vehicles trajectory is changed, comprising using a reference generator for steering system control, simultaneously suppressing steering device disturbances resulting from the mechanical interconnection, wherein the reference generator is arranged to continuously receive an input signal indicative of a steering intent of a driver, wherein the reference generator comprises at least one desired steering characteristic parameter producing a guiding torque value based on the input, and based on the guiding torque value output a signal indicative of a desired steering torque, which desired steering torque is compared to the actual steering torque of the vehicle, and wherein the output signal is continuously adapted so that the desired steering torque is transmitted to the driver, and where the actuator is controlled by applying a difference in torque between the desired steering torque and the actual steering torque to the actuator so that the actual steering torque is controlled to substantially equal the desired steering torque.

2. A method according to claim 1, comprising receiving a signal indicative of a current driving scenario, determining if it is desired to change the vehicle's trajectory by braking the at least one ground engaging member based on the driving scenario signal in order to avoid an undesired situation and if so automatically applying the braking force to the at least one ground engaging member.

3. A method according to claim 2, wherein the undesired situation represents a predicted departure from a predicted desired future trajectory of the vehicle.

4. A method according to claim 1, comprising suppressing the steering device disturbances resulting from the mechanical interconnection by decoupling a driver steering feel from the influence of the mechanical connection.

5. A method according to claim 1, comprising suppressing the steering device disturbances resulting from the mechanical interconnection by receiving a signal indicative of a steering angle and/or steering torque in the steering arrangement, determining if the steering angle will result in steering device disturbances, determining if it is desired to apply a force counteracting the steering device disturbances resulting from the steering angle and/or steering torque and if so generating a corresponding signal to an actuator arranged to apply such a counteracting force to the steering arrangement.

6. A method according to claim 5, comprising providing the driver of the vehicle with a desired steering feel based on a determined desired guiding force, which is applied to the steering device, and applying the determined guiding force to the steering device via the actuator.

7. A method according to claim 1, comprising providing the driver of the vehicle with a desired steering feel based on a determined desired guiding force, which is applied to the steering device.

8. A method according to claim 7, comprising receiving at least one signal indicative of a vehicle state and determining the guiding, force based on the at least one vehicle state signal.

9. A method according to claim 8, comprising determining a value and direction of the guiding force for changing the vehicle's future trajectory.

10. A method according to claim 8, comprising comparing the determined guiding force with a limit value, and if the determined guiding force exceeds the limit value applying the braking, force to the at least one ground engaging members so that the vehicle's trajectory is changed.

11. A method according to claim 10, comprising limiting the guiding force applied to the steering device to the limit value or below.

12. A method according to claim 7, comprising determining the guiding force based on at least one steering device guiding force operation model.

13. A method according to claim 12, wherein the at least one guiding force operation model comprises at least one desired steering characteristic parameter.

14. A method according to claim 13, wherein the at least one desired steering characteristic parameter comprises at least lateral acceleration and/or yaw rate and that the method comprises the step of modifying and/or canceling the effect of the lateral acceleration and/or yaw rate during the application of the braking force to the at least one ground engaging member.

15. A method according to claim 1, wherein the steering device comprises a steering wheel and that the guiding force forms a guiding torque applied to the steering wheel.

16. A method according to claim 1, comprising applying a brake pressure to at least one brake configured to brake the at least one of the pound engaging wheels.

17. A system for changing a vehicle's trajectory, wherein the vehicle comprises a steering arrangement comprising a manual steering device, an actuator adapted to provide a guiding torque to the steering arrangement, at least one pair of ground engaging, members and a mechanical interconnection between the manual steering device and the ground engaging members wherein the system comprises an arrangement for applying a braking force to at least one of the ground engaging members so that the vehicle's trajectory is changed, and an arrangement for suppressing steering device disturbances resulting from the mechanical interconnection, wherein a reference generator is operatively connected to the arrangement and arranged to continuously receive an input signal indicative of a steering intent of a driver, wherein the reference generator comprises at least one desired steering characteristic parameter producing a guiding torque value based on the input signal, and based on the guiding torque value output a signal indicative of a desired steering torque, which desired steering torque is compared to the actual steering torque of the vehicle, and wherein the output signal is continuously adapted so that the desired steering torque is transmitted to the driver, and where a difference in torque between the desired steering torque and the actual steering torque is arranged to be applied to the actuator so that the actual steering torque is controlled to substantially equal the desired steering torque.

18. A system according to claim 17, wherein the arrangement for suppressing steering device disturbances comprises means for detecting a steering angle and/or steering torque in the steering arrangement, means for determining if the steering angle and/or steering torque will result in steering device disturbances and generating a corresponding signal and an actuator arranged to receive the signal and responsively apply a force counteracting the disturbances to the steering arrangement.

19. A system according to claim 17, wherein the system comprises means for receiving a signal indicative of a current driving scenario, determining if it is desired to change the vehicle's trajectory by braking based on the driving scenario signal and generating a corresponding braking force signal to the means for applying a braking force.

20. A system according to claim 19, wherein the means for determining if it is desired to change the vehicle's trajectory is configured to generate a signal to a means for controlling the steering arrangement.

21. A system according to claim 17, wherein the system comprises means for providing the driver of the vehicle with a desired steering feel based on a determined desired guiding force.

22. A system according to claim 17, wherein the arrangement for suppressing steering device disturbances comprises a control function for detecting a steering angle and/or steering torque in the steering arrangement, a control function for determining if the steering angle and/or steering torque will result in steering device disturbances and generating, a corresponding signal and an actuator arranged to receive the signal and responsively apply a force counteracting the disturbances to the steering arrangement.

23. A system according to claim 17, wherein the system comprises a control function for receiving a signal indicative of a current driving scenario, determining if it is desired to change the vehicle's trajectory by braking based on the driving scenario signal and generating a corresponding braking force signal to the arrangement for applying a braking force.

24. A system according to claim 23, wherein the control function for determining if it is desired to change the vehicle's trajectory is configured to generate a signal to a controller for controlling the steering arrangement.

25. A system according to claim 17, wherein the system comprises an actuator for providing the driver of the vehicle with a desired steering feel based on a determined desired guiding force.

* * * * *